Dec. 30, 1958 A. M. COHEN 2,866,876
VARIABLE RESISTOR
Filed March 16, 1954 3 Sheets-Sheet 1

INVENTOR
ARTHUR M. COHEN
BY
Jameson Franklin
ATTORNEYS

Dec. 30, 1958     A. M. COHEN     2,866,876
VARIABLE RESISTOR
Filed March 16, 1954     3 Sheets-Sheet 2
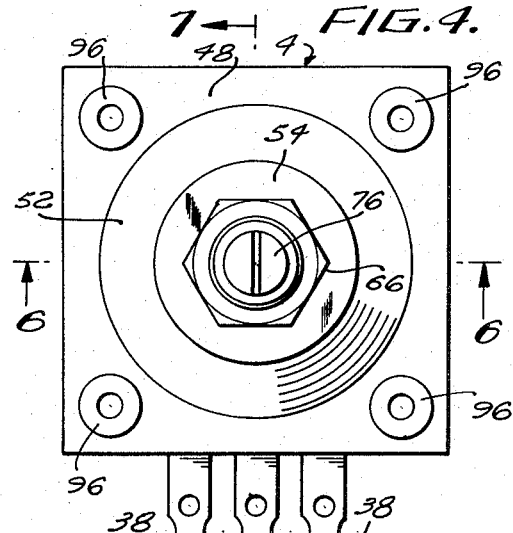
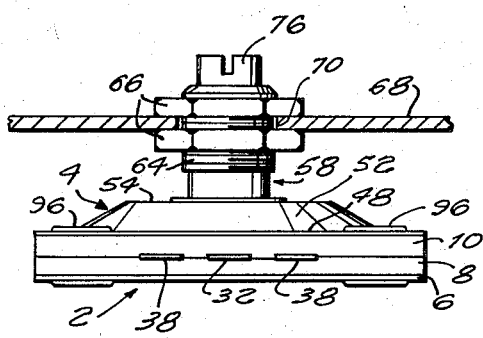
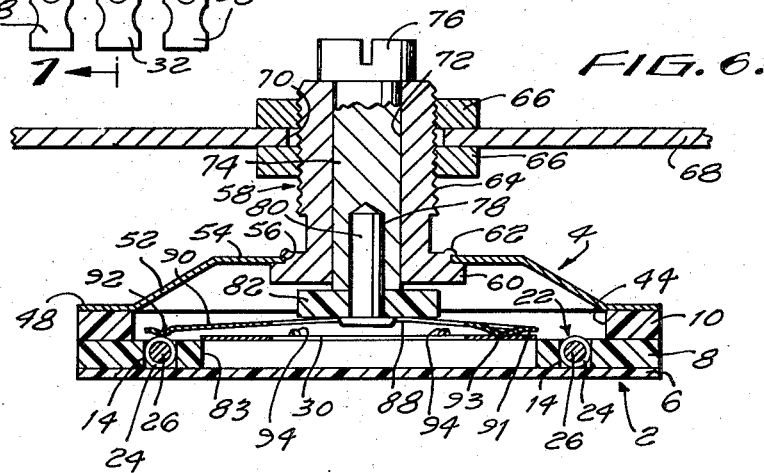
INVENTOR
ARTHUR M. COHEN
BY
James A. Franklin
ATTORNEYS Dec. 30, 1958          A. M. COHEN          2,866,876

VARIABLE RESISTOR

Filed March 16, 1954          3 Sheets-Sheet 3

INVENTOR
ARTHUR M. COHEN
BY James and Franklin
ATTORNEYS

United States Patent Office 2,866,876
Patented Dec. 30, 1958

2,866,876

VARIABLE RESISTOR

Arthur M. Cohen, Westport, Conn.

Application March 16, 1954, Serial No. 416,473

6 Claims. (Cl. 201—48)

The present invention relates to the structure of a variable resistor or potentiometer, and in particular to one which is extremely small, light and inexpensive and which is capable of withstanding much higher temperatures than similar devices of much more massive and complex structures.

The trend toward miniaturization of all types of electrical equipment, both for communication and control purposes, is well known. This trend has been intensified because of the increasing use of complex electrical equipment in aircraft, guided missiles and the like, where space and weight are exceedingly important factors. It is not so widely appreciated, however, that the heat resistive characteristics of miniaturized equipment is also of great significance in most installations. Particularly in the case of aircraft and guided missiles a great deal of heat-producing equipment is crammed into narrow and inaccessible spaces where it is difficult if not impossible to provide for adequate ventilation. Moreover, the speeds at which such craft travel tend to cause high temperatures inside themselves. It is necessary that the electrical components be able to withstand those elevated temperatures without deterioration or breakdown. This has been thought to require large and complex constructions, thus militating against achieving optimum size and weight. The problem has proved to be particularly acute in connection with the design and construction of variable resistors and potentiometers, perhaps partly because the passage of current through the resistance windings thereof tends to produce an appreciable amount of heat in addition to the ambient heat to which the units are subjected.

I have found that the size and weight of variable resistors and potentiometers can be minimized, while at the same time the heat resistive characteristics of such units can be maximized well above that rendered feasible by prior art constructions, through the use of a novel and extremely simple construction the parts of which are readily individually fabricatable on a mass production basis and are just as readily assembled into a finished unit. The resistance element, which preferably takes the form of a coil of resistance wire wound on a flexible core of suitable heat resistive material, is received within, and preferably is substantially completely received within, an arcuate slot on the base of the unit, that base also being formed of heat resistive material. A collector ring formed of a sheet of conductive material is mounted within the unit, preferably resting on the base, adjacent and parallel to the slot in which the resistance element is received. A wiper is provided having two electrically connected segments, one engageable with and slidable over the resistance element exposed through or at the top of the slot in which it is received, the other engageable with and slidable over the collector ring. An operative connection to the wiper is provided which passes through a wall of the unit so that the wiper may be moved to vary the effective resistance of the unit when it is connected as a potentiometer. In one illustrated embodiment raised portions on the collecting ring cooperate with the wiper segment slidable thereover to define positive stops limiting movement of the wiper to a predetermined degree. In another illustrated embodiment positive stops are defined by interengaging parts carried respectively by the wiper and a wall of the unit. As specifically disclosed the unit is built up from a plurality of sheets of appropriate material which are held together in any appropriate manner. The structure is designed to be mounted on a panelboard or the like so that the unit is on one side of the panel, protected thereby, adjustment of the unit being possible from the other side of the panel. The mounting arrangement is such as to render the unit shock-resistant and to maximize its heat dissipative properties.

To the accomplishment of the above, and to such other objects as may hereinafter appear, the present invention relates to the structure of a variable resistor unit as defined in the following claims and as described in this specification, taken together with the accompanying drawings, in which:

Fig. 4 is a top plan view of the fully assembled unit;

Fig. 5 is a side elevational view thereof, showing the unit mounted on a panelboard;

Fig. 6 is a cross sectional view taken along the line 6—6 of Fig. 4 and showing the unit mounted on a panelboard;

Fig. 7 is a cross sectional view similar to Fig. 6 but taken along the line 7—7 of Fig. 4;

Figure 1:
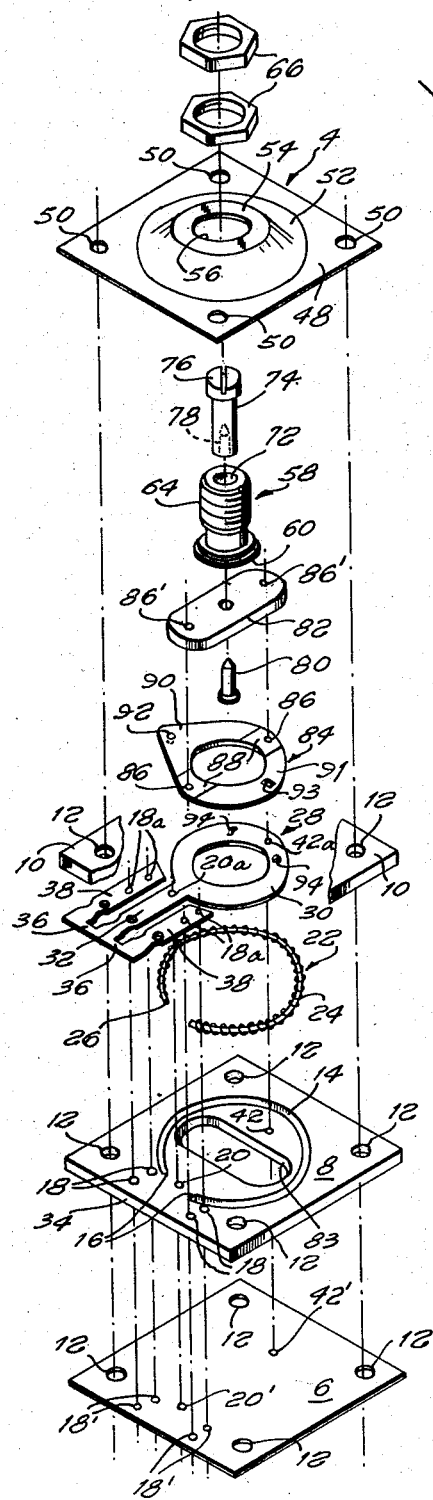
Fig. 1 is a perspective exploded view of the various components of the structure.
Figure 3:
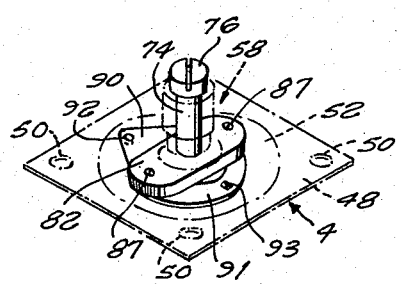
Fig. 3 is a perspective view, partially in phantom, showing the upper part of the unit in assembled condition ready to be placed on the base, the wiper and operating means therefor being shown in solid lines.

The unit comprises a base generally designated 2 and an upper part generally designated 4. While the base may be formed of a single piece of material molded, machined or otherwise made into proper shape or configuration, it has been found most desirable from a production point of view to form it from a plurality of sheets or plates of heat-resistive insulating material, of which silicone fiberglass has been found to be particularly suitable. These sheets or plates comprise a back 6, a guide 8 and a separator 10, all preferably of similar outer configuration and provided with registering apertures 12 for uniting purposes. As indicative of the small size of the overall unit, the back sheet 6 may be 1/32 inch thick, the guide sheet 8 may be 1/16 inch thick and the separator sheet 10 may be 1/16 inch thick, their outer dimensions being 1½ inches square. The guide sheet 8 is provided with an arcuate slot 14 which may extend through the entire thickness thereof, the slot terminating in ends 16 adjacent which a plurality of apertures 18 and 20 are provided adapted to register with corresponding apertures 18' and 20' in the back sheet 6. The resistance element, generally designated 22, may take any desired form, and is here disclosed specifically as comprising resistance wire 24 coiled helically about a supporting core 26 of suitable and preferably flexible insulating and heat resistive material such as fiberglass. Flexible material for the core 26 is preferred so that the resistance element 22 may be formed in a straight line on conventional machinery and then bent to conform to the curvature of the slot 14. The dimensions of the slot 14 are such that the resistance element 22 is received therein, and preferably is substantially completely received therein. In the instant drawings the resistance element 22 is illustrated as projecting slightly above the upper surface of the guide plate 8, but this is not at all essential. In many instances it is preferred that the upper surface of the resistance element 22 be flush with or even slightly below the upper surface of the sheet 8, access to the upper surface of the resistance element 22 being permitted through the open top of the slot 14. This recessed mounting of the resistance element 22 is thought to greatly improve the heat resistance characteristics of the unit.

A combination collector ring and terminal unit generally designated 28 and formed of a thin sheet of conductive material having a thickness, for example, of .0063 inch, is placed on the upper surface of the sheet 8. The unit 28 comprises a ring-like collector portion 30 concentric with and having a lesser radius of curvature than the slot 14, to which a terminal portion 32 is secured, the latter extending out beyond the end edge 34 of the sheet 8. A web 36 connects the outer tip of the terminal 32 to terminal strips 38, the inner ends of the strips 38 being adapted to overlie, engage and make electrical connection with the ends of the resistance element 22 when that element is within the slot 14. The terminal 32 is provided with aperture 20a adapted to register with the apertures 20 and 20', and the terminal strips 38 are provided with apertures 18a adapted to register with the apertures 18 and 18', rivets or eyelets 40 passing through the apertures 18, 18a and 18' and 20, 20a and 20' respectively in order to hold the unit 28 in position. If desired, the collector ring 30 may be provided with an aperture 42a registering with corresponding apertures 42 and 42' in the sheets 8 and 6 respectively, a rivet or eyelet 40 passing through that set of apertures as well. After the unit 28 has been thus placed in position, the web portion 36 is severed from the terminal strips 32 and 38, thus electrically separating those terminals, as may best be seen from Figs. 2 and 4.

After the unit 28 has been riveted or eyeleted to the sheets 8 and 6 the separator sheet 10 is placed on top of the sheet 8, the sheet 10 having an inner opening 44 with a diameter greater than that of the slot 14 so as to expose the resistive unit 22 and the collector ring 30 therethrough. Forwardly extending slots 46 may be formed in the sheet 10 in order to provide clearance for the rivets 40 which pass through the apertures 18a.

The upper part 4 of the unit, which may be formed from a stamped sheet of metal or the like, such as a sheet of brass having a thickness of 1/64 inch, is defined in part by a flat outer portion 48 adapted to rest upon the upper surface of the separator sheet 10 and provided with apertures 50 which register with the apertures 12. An upwardly and inwardly inclined wall 52 connects the outer portion 48 to a raised inner portion 54 having an aperture 56 therethrough which is preferably concentric with the slot 14 and the collector ring 30. A shank 58 formed of brass or similar material passes through the aperture 56 and is secured to the inner raised portion 54 of the upper part 4, the shank 58 having a lower rim 60 larger than the aperture 56 and held against the underside of the portion 54, parts of the shank 58 above the raised inner portion 54 being upset, as at 62 (see Figs. 6 and 7), in order to retain the shank in position. The upper part of the shank 58 is externally threaded, at 64, and a pair of locking nuts 66 are threaded thereover and adapted to be received on opposite sides of a panelboard 68 provided with an aperture 70 through which the externally threaded portion 64 of the shank 58 is passable, thus mounting the shank 58, and through it the entire unit, on the panel 68.

The shank 58 is centrally apertured at 72 and a shaft 74 is passable therethrough into the interior of the unit, that shaft also preferably being formed of brass. It is provided with a slotted head 76 for adjustment purposes and its lower end is vertically apertured at 78 to receive a stud 80 which secures a spreader 82 thereto, this spreader being formed of any suitable insulating and heat resistive material. For purposes of economy the spreader 82 is cut from the very sheet of insulating material which defines the guide sheet 8, the central opening 83 in the latter being formed by the removal of the spreader 82 from the sheet 8.

A conductive wiper generally designated 84 and formed of a suitable resilient conductive material is secured to the spreader 82, rivets or eyelets 87 passing through the apertures 86 in flat portions 88 thereof and through registering apertures 86' in the spreader 82. The wiper 84 has a pair of outwardly and downwardly extending resilient brush segments 90 and 91, the former extending out radially of greater distance than the latter. The segment 90 is provided with a dimple 92 adapted to engage and ride over the upper surface of the resistor element 22 as the wiper 84 is rotated. The segment 91 has a portion 93 extending down therefrom and preferably severed along its sides from the segment 91 so that its side edges are exposed, this portion 93 being adapted to engage and slide over the collector ring 30. The collector ring 30 is in the embodiment of Figs. 1–7 provided with a pair of appropriately spaced upwardly projecting portions 94 the sides of which are also preferably severed from the body of the collector ring 30 so that its edges are exposed, these portions 94 being disposed in the path of the wiper-carried portion 93 so that oppositely facing exposed side edges of the portions 93 and 94 will engage at opposite limits of rotation of the wiper 84, preferably corresponding to positions when the dimple 92 on the segment 90 makes electrical connection with one end of the other of the resistive element 22, the portions 94 thus defining positive stops for movement of the wiper 84.

Figure 2:
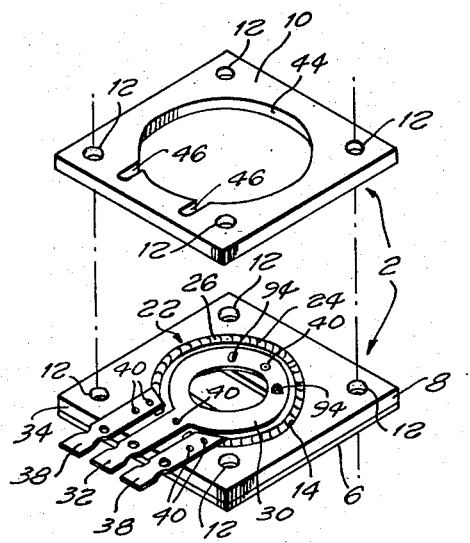
Fig. 2 is a perspective and partially exploded view of the base thereof with the resistive element, collector ring and terminals in place.

In assembly of the unit, the base, defined by the sheets 6, 8 and 10, the resistive element 22, the collector ring 30 and the terminals 32 and 38, is first assembled (see Fig. 2). The upper part 4 with the shank 58, shaft 74, spreader 82 and wiper 84 mounted thereon, is separately assembled (see Fig. 3). Then the upper part 4 is placed on top of the base 2 with the apertures 50 registering with the apertures 12, and the entire unit is secured together by means of rivets or eyelets or the like 96 which pass through the apertures 12 and 50. While clearance for the terminal strips 32 and 38 could be provided on the undersurface of the separator sheet 10, this has not proved to be necessary, those terminal strips being thin enough, in conjunction with the inherent softness of the sheets 8 and 10, to produce an effective seal between those sheets and around those strips when moderate assembling pressure is applied to the unit prior to the insertion of the rivets or eyelets 96.

While silicone fiberglass has been here specifically disclosed as the material from which the sheets 6, 8 and 10 are formed, and while fiberglass has been specifically disclosed for the composition of the resistive element core 26, these materials having proved to be exceedingly desirable from the point of view of cost, heat resistance, insulating characteristics and ease of fabrication, it will be understood that other comparable materials could be employed in their stead.

Figure 8:
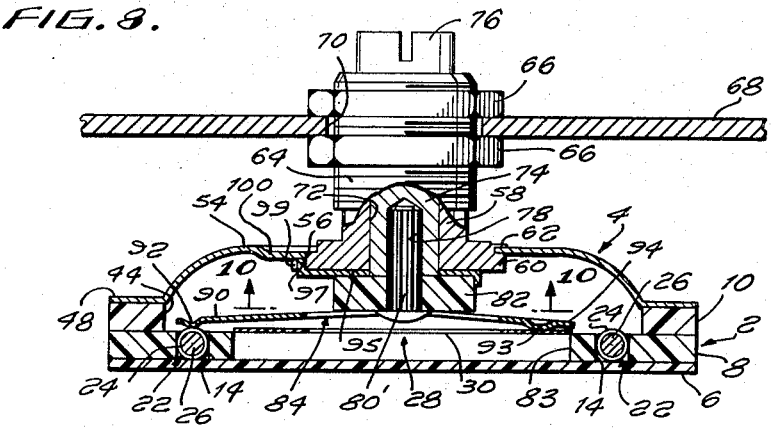
Fig. 8 is a cross-sectional view corresponding to Fig. 6 but of an alternative embodiment.
Figure 9:
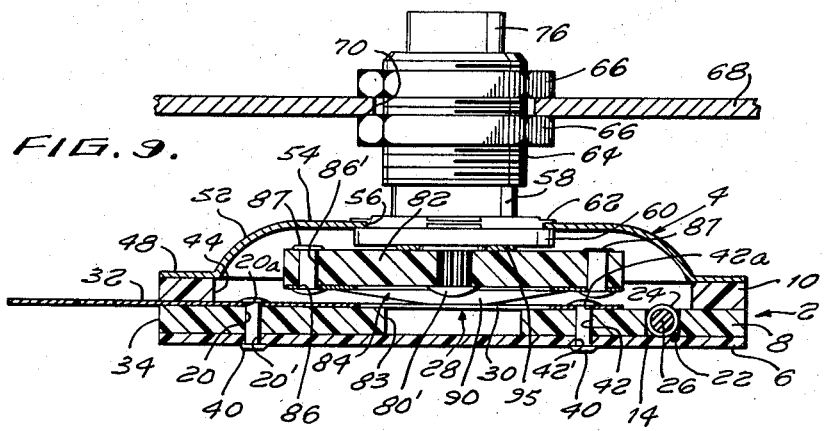
Fig. 9 is a cross-sectional view corresponding to Fig. 7 but of said alternative embodiment.
Figure 10:
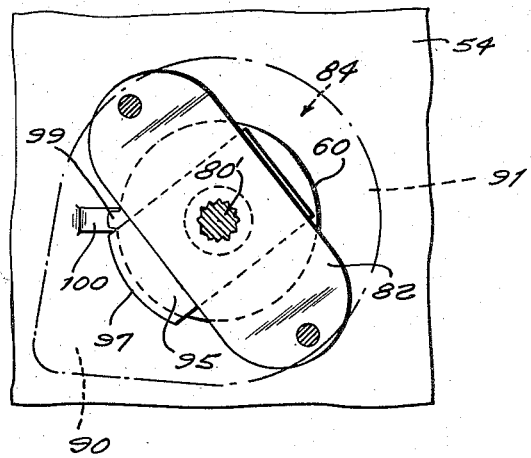
Fig. 10 is a plan view of said alternative embodiment taken along the line 10—10 of Fig. 8.

The embodiment of Figs. 8–10 differs from the embodiment of Figs. 1–7 primarily in disclosing a different arrangement to define positive stops for the movement of the wiper 84 in each direction of movement. A member 95 is secured to the shaft 74 above the spreader 82, that member having a laterally extending portion with an upwardly projecting finger 97 thereon, which finger, as may best be seen in Fig. 10, is of appreciable width. The large lower rim 60 of the shank 58 has a finger 99 extending laterally therefrom into the path of movement of the wiper-carried finger 97, the latter being shown as extending up around the periphery of the shank rim 60. By proper positioning of the shank finger 99 and the wiper-finger 97, and by proper choice of the width of the wiper-finger 97, rotative movement of the wiper 84 at each extreme limit of motion will be positively stopped so that the dimple 92 at the end of the wiper segment 90 will engage one end or the other of the resistive element 22. The shank-finger 99 may be preformed, but is preferably formed by an upsetting action at the same time that the shank is deformed at 62, a portion of the raised inner wall 54 of the upper part 4, identified by the reference numeral 100, being punched down along with that part of the shank rim 60 which lies immediately therebelow, thus producing the finger 99. The positive stop structure of Figs. 8–10 is stronger than that of the embodiment of Figs. 1–7, and consequently will withstand greater rotative forces applied to the shaft 74 without distortion or damage.

Additional differences between the two embodiments may be seen in the specific configuration of the upper portion 4 and in the use, in the second embodiment, of a fluted stud 80' to secure the spreader 82 and the member 95 to the shaft 74.

In some instances, particularly when the resistance value of the resistive element 22 is low, variations in the contact resistance between the terminals 38 and the ends of the resistive element 22 may cause inadmissible variations in the overall resistance of the assembled units. To avoid this situation, some of the resistance wire 24 at the ends of the resistive element 22 may be unwound from the core 26 and carried along the lengths of the terminals 38 to the tips thereof, there being conductively secured in any appropriate manner, as by the use of solder or by being clamped beneath eyelets or rivets passed through the projecting terminal tips 38.

It will be clear from the above that all of the component parts of the instant unit can be readily manufactured on a mass production basis in an extremely inexpensive and economical manner. The inner and outer configuration of each of the elements is extremely simple, the operations required to form them are conventional, reliable and speedy, and the cost of dies is greatly minimized.

In addition to producing a unit which is extremely small (a commercial unit having overall dimensions of 1½ x 1½ x 49/64 inches has been produced on an extensive scale), the instant construction also gives rise to a unit capable of withstanding much higher temperatures than the more expensive and complex structures of the prior art. A measure of the improved heat resistive characteristics of the instant device may be appreciated from the fact that a unit having the dimensions set forth above is conservatively rated at 6 watts at 20° C., 3 watts at 110° C., 2 watts at 140° C. and 0 watts at 200° C. These ratings far exceed those of comparable devices now available on the market.

It will be appreciated, particularly from Figs. 5–7, that when the unit in question is mounted on a panelboard 68 the operative parts thereof are securely protected on one side of the panel 68, while the slotted head 76 of the shaft 74 is readily accessible from the other side of the panel 68 so that the setting of the resistor or potentiometer may be varied at will. Moreover, the unit is mounted away from the board 68, thus permitting maximum passage of air therearound for heat dissipative purposes, yet any displacement of the unit with respect to the board 68 is firmly resisted by a unitary part of the overall assembly, to wit, the shank 58, and even if some such displacement does occur, the ready adjustability of the setting of the unit will not be impaired.

While but a single embodiment of the present invention has been here disclosed, it will be apparent that many variations may be made in the details thereof, without departing from the spirit of the invention as defined in the following claims.

I claim:

1. A built-up variable resistor unit comprising a base sheet of heat resistive material, a second sheet of heat resistive and insulating material thereon and having an upwardly opening arcuate slot therein, a resistance element in said slot, an arcuate conductive collector strip on said second sheet and substantially concentric with said slot, a third sheet of heat-resistive material on said second sheet and having an inner opening exposing said resistance element and said collector strip, terminals electrically connected respectively to said collector strip and at least one end of said resistance element and extending to the exterior of said unit, a cap on top of said third sheet and having a body portion above and spaced upwardly from said resistive element and said collector strip, means engaging said sheets and cap and retaining them in assembled position, a conductive wiper rotatably mounted on and inside said cap at the common center of the arcs of said resistive element and said collector strip, said wiper having segments passing through the inner opening of said third sheet and respectively engaging and sliding over said resistive element and said collector strip, and means accessible from the exterior of said unit and operatively connected to said wiper for rotating the latter.

2. The resistor unit of claim 1, in which said terminals extend to the side of said unit between said second and third sheets.

3. The resistor unit of claim 1, in which said resistance element comprises a coil of resistance wire or the like wound helically about a core, said sheets and said core being formed of a fiberglass material, said cap being formed of metal, said wiper being insulated from said cap.

4. The resistor unit of claim 1, in which said resistance element comprises a coil of resistance wire or the like wound helically about a core, said sheets and said core being formed of a fiberglass material, said cap being formed of metal, said wiper insulated from said cap, and in which said terminals extend to the side of said unit between said second and third sheets.

5. A variable resistor unit comprising a base formed of heat resistive insulating material having a raised outer rim surrounding an inner portion with an arcuate slot therein, a resistance element substantially completely received within said slot and extending up therefrom by a small distance less than the height of said rim, a cap for said unit comprising an outer portion secured to said base and a body portion above and upwardly spaced from said inner base portion, an arcuate conductive collector strip mounted on said inner base portion concentric with said slot, terminals electrically connected respectively to said collector strip and at least one end of said resistance element and extending to the exterior of said unit, a conductive wiper rotatably mounted on said cap between the body portion thereof and said inner base portion so as to be rotatable about the common center of the arcs of said slot and said collector strip, said wiper having segments engaging and sliding over said resistance element and collector strip respectively, and means on the exterior of said unit operatively connected to said wiper to move the same, said resistance element comprising a coil of resistance wire or the like wound helically about a core, said base and said core being formed of a fiberglass material, said upper part being formed of metal, said wiper being insulated from said other part, said collector strip being provided with spaced abutments between which the corresponding wiper segment slides, said abutments being formed by upsetting portions of said strip, said segment engaging said abutments at each extreme limit of its movement, said abutments thus functioning as positive stops.

6. A variable resistor unit comprising a base formed of heat resistive insulating material having a raised outer rim surrounding an inner portion with an arcuate slot therein, a resistance element substantially completely received within said slot and extending up therefrom by a small distance less than the height of said rim, a cap for said unit comprising an outer portion secured to said base and a body portion above and upwardly spaced from said inner base portion, an arcuate conductive collector strip mounted on said inner base portion concentric with said slot, terminals electrically connected respectively to said collector strip and at least one end of said resistance element and extending to the exterior of said unit, a conductive wiper rotatably mounted on said cap between the body portion thereof and said inner base portion so as to be rotatable about the common center of the arcs of said slot and said collector strip, said wiper having segments engaging and sliding over said resistance element and collector strip respectively, and means on the exterior of said unit operatively connected to said wiper to move the same, said resistance element comprising a coil of resistance wire or the like wound helically about a core, said base and said core being formed of a fiberglass material, said upper part being formed of metal, said wiper being insulated from said other part, said wiper carrying a part movable therewith, a second part being mounted on the body portion of said cap and extending into the path of travel of said wiper-carried part, said parts engaging and functioning as positive stops for said wiper.

References Cited in the file of this patent

UNITED STATES PATENTS

| | | |
|---|---|---|
| 1,415,534 | Donle | May 9, 1922 |
| 1,676,869 | Richter | July 10, 1928 |
| 1,997,258 | Krieger | Apr. 9, 1935 |
| 2,606,985 | De Bell | Aug. 12, 1952 |
| 2,632,832 | Bush et al. | Mar. 24, 1953 |